Figure 1:
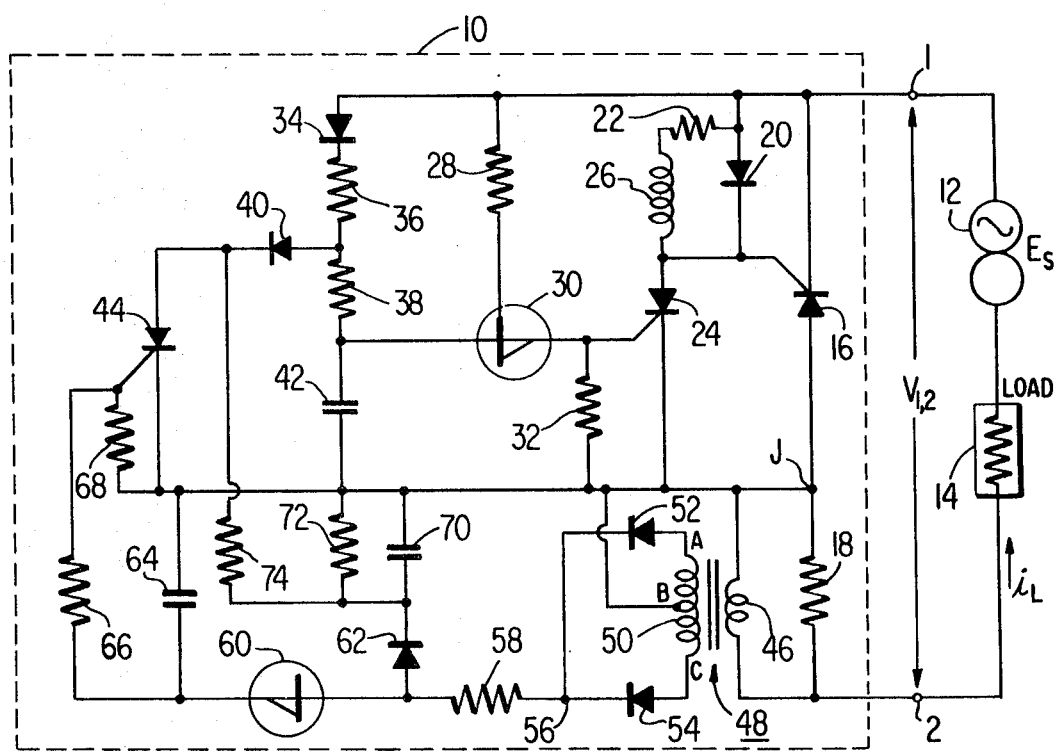

United States Patent

[11] 3,602,773

[72] Inventor Albert Berstein
Sepulveda, Calif.
[21] Appl. No. 856,246
[22] Filed Aug. 11, 1969
[45] Patented Aug. 31, 1971
[73] Assignee RCA Corporation

[54] AC OVERCURRENT PROTECTION CIRCUIT
5 Claims, 2 Drawing Figs.
[52] U.S. Cl. .................................................. 317/33 SC,
317/38, 317/49
[51] Int. Cl. ........................................................ H02h 1/04,
H02h 3/08
[50] Field of Search ............................................. 317/49, 33
SC, 38

[56] References Cited
UNITED STATES PATENTS
3,295,020 12/1966 Borkovitz ..................... 317/33
3,299,322 1/1967 Roberts ........................ 317/49 X
3,359,458 12/1967 Leete ........................... 317/49 X Primary Examiner—James D. Trammell
Attorney—E. J. Norton ABSTRACT: An AC current limiter is disclosed which detects an overcurrent and within one cycle open-circuits the connection between a source of power and a load. An optional self-resetting feature of the circuit permits Automatic Load-To-Power Source Reconnection on a Self-Recycling Try-Again Basis. There is also disclosed means for detecting an inrush current and for preventing the open-circuit condition from occurring if the overcurrent is an inrush current.

PATENTED AUG 31 1971 3,602,773

INVENTOR.
Albert Bernstein
BY Harry W. Barron
ATTORNEY

AC OVERCURRENT PROTECTION CIRCUIT

The invention herein described was made in the course of or under a contract or subcontract thereunder with the Department of the Navy.

This invention relates to AC overcurrent protection and more particularly to a circuit for recognizing an overcurrent which is not an inrush current and thereafter within one cycle open-circuiting the source to load current path.

In the prior art many circuits and mechanical apparatus exist for detecting and preventing excess current from reaching a load. The systems now in use however, are incapable of providing the features of both fast shutdown protection and an innate sensitivity to normally high inrush start-up currents.

For instance, mechanical circuit breakers require several line cycles of overcurrent prior to shutdown. On the other hand, in electronic protection circuits such as a crowbar circuit, rapid response to overcurrent is possible but the configuration is subject to false 'trip-off' when high initial inrush currents occur. In addition, crowbar circuits are impractical for loads dissipating several kilowatts of power.

It is an object of this invention to provide an improved overcurrent protection circuit.

In accordance with an embodiment of this invention there is provided a switching circuit which can be coupled between a source of AC power and a load. Threshold means are also provided which are responsive to the current flowing through the switching circuit for open circuiting the switching circuit when the current through it exceeds a certain value. In addition there is provided inrush inhibiting means for inhibiting the threshold means if the overcurrent is an inrush current.

Figure 2:
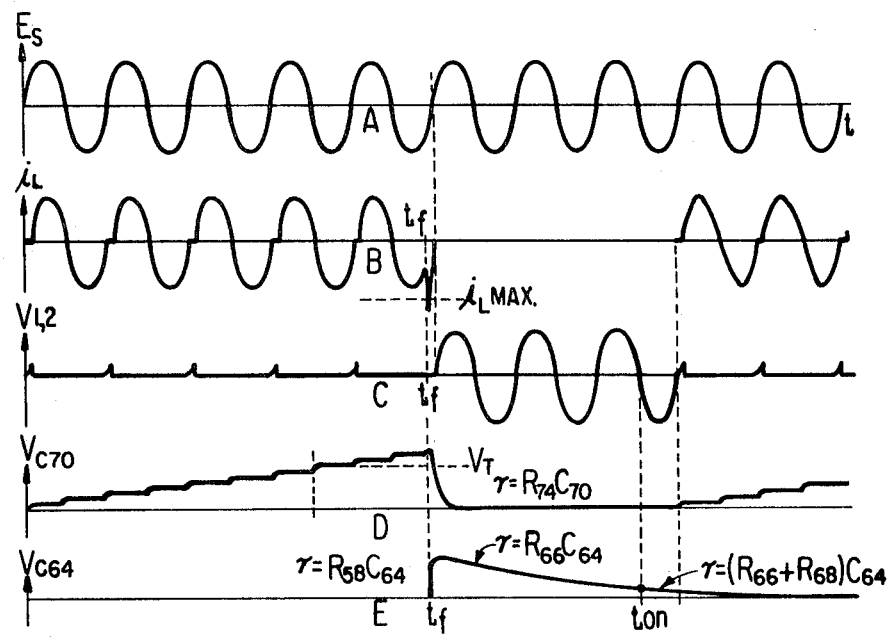

The invention will be better understood when reference is made to the accompanying drawing in which:

FIG. 1 is a schematic diagram of an overcurrent protection circuit according to this invention; and FIG. 2 is a series of waveforms helpful in understanding the operation of the circuit in FIG. 1.

Reference is now made to FIG. 1 which shows a schematic diagram of an overcurrent protection circuit 10 having two terminals, 1 and 2, serially coupled with a source of alternating current (AC) power 12 and a load 14. As long as the current from source 12 remains below a certain value, circuit 10 will act substantially as a short circuit and power will be supplied to load 14. However, if during normal operation, the current supplied to load 14 exceeds an acceptable value, circuit 10 will then act as an open circuit, thus protecting the load from the overcurrent. As used herein, the term "overcurrent" is intended to mean a current which exceeds an acceptable predetermined value.

Terminal 1 is connected to the cathode of silicon control rectifier (SCR) 16, the anode of which is connected to junction J. One terminal of sampling resistor 18 which has very low value, such as 0.1 ohm, is connected to junction J, the other terminal being coupled to terminal 2 of circuit 10. Terminal 1 is also connected to the anode of diode 20 and one end of resistor 22. The cathode of diode 20 is connected to the gate electrode of SCR 16 and to the anode of SCR 24. The other end of resistor 22 is coupled to one terminal of an inductor 26 and the other terminal of inductor 26 is coupled to the anode of SCR 24. The cathode of SCR 24 is connected to the junction J.

Terminal 1 is further connected through resistor 28 to the gate electrode of silicon unidirectional switch (SUS) 30. The cathode of SUS 30 is connected to the gate electrode of SCR 24 and to one terminal of resistor 32. The other terminal of resistor 32 is connected to junction J.

Terminal 1 is further connected to the anode of diode 34, the cathode of which is connected to one terminal of resistor 36. The other terminal of resistor 36 is connected to one terminal of resistor 38 and the anode of diode 40. The other terminal of resistor 38 is connected to the anode of SUS 30 and to one terminal of capacitor 42. The other terminal of capacitor 42 is connected to the junction J. The cathode of diode 40 is connected to the anode of SCR 44, and the cathode of SCR 44 is connected to the junction J.

The primary winding 46 of step-up transformer 48 is connected in parallel with resistor 18. The secondary 50 of transformer 48 has three terminals A, B and C with terminal B being a center tap and terminals A and C being end taps. Terminal B is connected to junction J; terminal A is connected to the anode of diode 52; and terminal C is connected to the anode of diode 54. The cathodes of diodes 52 and 54 are connected together at point 56 which is connected to one terminal of resistor 58.

The other terminal of resistor 58 is connected to the anode of SUS 60 and the anode of diode 62. The cathode of SUS 60 is connected to one terminal of capacitor 64 and one terminal of resistor 66. The other terminal of capacitor 64 is connected to the junction J and the other terminal of resistor 66 is connected to the gate electrode of SCR 44. Resistor 68 is connected between the junction of resistor 66 and the gate electrode of SCR 44 and the junction J. The cathode of diode 62 is connected to one terminal of capacitor 70, resistor 72 and resistor 74. The other terminal of capacitor 70 and resistor 72 are connected to the junction J and the other terminal of resistor 74 is connected to the junction of the anode of SCR 44 and diode 40.

The operation of the circuit shown in FIG. 1 will now be explained with reference being made as necessary to the various waveforms shown in FIG. 2. An AC voltage $V_{1,2}$ is applied between terminals 1 and 2 of circuit 10. The positive half-cycle of this voltage is passed by diode 34 through resistors 36 and 38 and provides a charging current to capacitor 42. As soon as the voltage across capacitor 42 reaches the threshold voltage of SUS 30, it begins conducting and SCR 24 is turned on. Capacitor 42 should have a sufficient voltage across it to trigger SUS 30 within about 15° of the positive half-cycle of source voltage $E_s$. When SCR 24 is triggered, the positive half-cycle of load current $i_L$ will flow through diode 20, SCR 24 and resistor 18 to terminal 2 and load 14. During this positive half-cycle, inductor 26 will store enough energy to turn on SCR 16. Thus during the negative half-cycle of current $i_L$, SCR 16 will conduct and the negative half-cycle current will flow through SCR 16 and resistor 18 to terminal 2 and load 14. Thus during normal operation, circuit 10 acts as a short circuit to current $i_L$ except during the first 15° of each cycle. This can be seen in FIGS. 2A, 2B and 2C to the left of time $t_f$.

During normal operation, the voltage across capacitor 70 will be greater than the threshold voltage of SUS 60, as will be explained in detail hereinafter. Thus diode 62 will be reverse biased at all times and therefore diode 62 and capacitor 70 can, for the present time, be neglected. When an overcurrent occurs, the voltage across resistor 18 increases causing the voltage across primary winding 46 and secondary winding 50 of transformer 48 to likewise increase. The voltage across secondary winding 50 is full wave rectified by diodes 52 and 54 and a series of positive half-cycle voltages appear at point 56, and the anode of SUS 60. The values of resistors 18 and 58, and the turns ratio of transformer 48 are chosen so that the peak value of the load current $i_L$, produces a voltage applied to the anode of SUS 60 that is just below its threshold voltage for the maximum acceptable current $i_L$. Thus, when an overcurrent occurs as shown at time $t_f$ in FIG. 2B, the voltage at the anode of SUS 60 will exceed its threshold voltage and it will conduct. Once SUS 60 conducts, capacitor 64 will begin to charge with a time constant approximately equal to $R_{58} C_{64}$. The values of resistor 58 and capacitor 64 should be such that the time $R_{58} C_{64}$ is very short with respect to one cycle of current $i_L$, as shown at time $t_f$ in FIG. 2E.

When capacitor 64 becomes charged, the voltage thereacross will be sufficient to turn on SCR 44. This, in turn, clamps the voltage across capacitor 42 to a value equal to the total voltage drop across both diode 40 and SCR 44 which will be less than the threshold voltage of SUS 30. SUS 30 will therefore not conduct and thus SCR 24 will not be turned on.

This, in turn, prevents current from flowing through inductor 26 so therefore SCR 16 will not be turned on. Thus, since neither SCR's 16 and 24 are turned on, no current can reach junction J, and circuit 10 acts as an open circuit.

Once capacitor 64 becomes fully charged and SCR 44 is turned on, capacitor 64 begins to discharge through resistor 66 and the gate-to-cathode junction of SCR 44 to junction J and capacitor 70 discharges relatively quickly through resistor 74 to junction J. Once the voltage across capacitor 64 decreases below the value required to fire the gate of SCR 44, SCR 44 will turn off when its anode goes to zero at the end of one of the positive half-cycles, and SCR's 16 and 24 again conduct as previously explained and as shown at time $t_{on}$ in FIGS. 2B, 2C and 2E. Capacitor 64 will continue to discharge thereafter through resistors 66 and 68 to junction J.

If it is desired to provide a nonresetting configuration in which the open circuit condition is maintained indefinitely after a load fault condition has occurred, a capacitor (not shown) may be connected from the junction of diode 34 and resistor 36 to junction J. This will keep the anode of SCR 44 positive at all times and thus it can't become reversed biased and won't be turned off. To change the open circuit condition, one will have to either discharge the capacitor manually or remove the source voltage, $E_s$ temporarily.

When load 14 first begins to draw current from source 12 an inrush current occurs. An inrush current is defined herein to be a current occurring during the first few cycles which is greater than the acceptable current. It is necessary that circuit 10 not open circuit during the time the inrush current occurs. Prior to applying current to load 14, capacitor 70 had completely discharged through resistor 72 so that there is a zero voltage across it. Current $i_L$ flows through SCR 16 and 24 as previously explained and through resistor 18. Transformer 48 applies a voltage proportional to the voltage across resistor 18 from its primary winding 46 to its secondary winding 50. This voltage across secondary winding 50 is full wave rectified by diodes 52 and 54 and a voltage of positive half-cycles appears at point 56 with respect to the junction J.

This signal at point 56 is applied through resistor 58 and diode 62 to capacitor 70 which charges up. If the values of resistor 58 and capacitor 70 are chosen so that the RC time constant thereof is considerably longer than one cycle of current $i_L$, it will require several cycles for capacitor 70 to become fully charged and thus it acts as an integrator during this time. Until the voltage at the junction of capacitor 70 and the cathode of diode 62 is equal to the threshold voltage of SUS 60, SUS 60 can never conduct because all the energy applied thereto is absorbed by capacitor 70 through diode 62. This will require several cycles of current $i_L$, as shown in FIG. 2D. Furthermore, the current at the junction of the resistors 36 and 38 applied through blocking diode 40 and resistor 74, charges up capacitor 70. The values of resistors 36, 38 and 74 are chosen such that capacitor 70 will eventually charge up to a voltage greater than the threshold voltage of SUS 60, thereby reverse biasing diode 62. As previously explained, until the voltage at the cathode of diode 62 is greater than the threshold voltage of SUS 60, SUS 60 cannot conduct. However, once the voltage at the cathode of diode 62 exceeds this threshold voltage, any voltage appearing at the anode of diode 62 greater than the threshold voltage of SUS 60 will cause it to conduct, thereby charging up capacitor 64 and causing circuit 10 to act as an open circuit. Thus SUS 60 will never conduct during the first several cycles of inrush current because of the integrating action of capacitor 70 and therefore the inrush currents are not detected as overcurrents by SUS 60. When SUS 60 conducts and causes SCR 44 to turn on, capacitor 70 will discharge through resistor 74 so that when the open circuit condition ceases to exist, the inrush current due to circuit 10 becoming a short circuit will not falsely trip off the circuit.

In circuit 10 the following components and values may be used in order to obtain the defined circuit operation.

| | | |
|---|---|---|
| Resistor | 18 | 0.1 ohm, 10 w. |
| | 22 | 3.3 ohm |
| | 28 | 1 M ohm, 2 w. |
| | 32 | 220 ohm |
| | 36 | 15 K ohm, 10 w. |
| | 38 | 1 K ohm |
| | 58 | 220 ohm |
| | 66 | 22 K ohm |
| | 68 | 4.7 K ohm |
| | 72 | 330 K ohm |
| | 74 | 220 ohm |
| Capacitor | 42 | 0.15 microfarad |
| | 64 | 4.7 microfarad |
| | 70 | 10 microfarad |
| Inductor | 26 | 2 millihenry |
| Transformer | 48 | UTC W-784 |
| Diode | 20 | IN 1186R |
| | 34 | IN 1731A |
| | 40 | IN 645 |
| | 52 | IN 645 |
| | 54 | IN 645 |
| | 62 | IN 645 |
| SCR | 16 | C137 P B |
| | 24 | C137 P B |
| | 44 | 2N2326A |
| SUS | 30 | 2N4985 |
| | 60 | 2N4985 |

Circuit 10 may also be used as an overvoltage protection circuit merely by applying the voltage being protected through a threshold device, such as a SUS, between terminal B of the secondary winding 50 of transformer 48 and point 56.

What is claimed is:

1. An AC protection circuit comprising:
   switching means which can be coupled between a source of AC signals and a load;
   threshold means, including a first RC circuit having a time constant of less than the duration of one cycle of said AC signal, said threshold means being responsively to the current flowing through said switching means for open-circuiting said switching means within one cycle of said AC signal when inrush current inhibiting means for inhibiting said threshold means from open circuiting said switching means for a certain time when said current which exceeds said given value is an inrush current.

2. The invention according to claim 1, wherein said inrush current inhibiting means includes a second RC time constant circuit having a time constant greater than the duration of a plurality of cycles of said AC signal, said inrush inhibiting means preventing said threshold means from open-circuiting said switching means for said plurality of cycles for inrush currents exceeding said given value.

3. A two-terminal AC overcurrent protection circuit capable of being serially coupled between a source of AC power and a load for preventing an overcurrent other than an inrush overcurrent from being applied from said source to said load, said circuit comprising,
   AC switching means and a sampling resistance serially connected between two terminals,
   a capacitance means including a capacitor and a diode, the cathode of said diode being coupled to one side of said capacitor;
   means for coupling the other side of said capacitor and the anode of said diode across said sampling resistance;
   said capacitor being responsive to the peak value of the voltage across said resistance, said capacitor being charged to at least a certain voltage during a certain number of cycles of said voltage across said resistance;
   means for charging said capacitor to a voltage greater than said certain voltage, said diode being reversed biased when said capacitor is charged above said certain voltage; and
   threshold means coupled in parallel with said capacitance means for open-circuiting said switching means on the occurrence of an overcurrent after said capacitor has charged to said certain voltage.

4. The invention according to claim 3, wherein said threshold means includes a threshold device having a threshold voltage, and means for coupling said threshold device between said anode of said diode and said AC switching means, said threshold voltage of said device being said certain voltage, whereby whenever the voltage at the anode of said diode exceeds said threshold voltage and said capacitor is charged above said certain voltage, said threshold device open circuits said switching means.

5. The invention according to claim 4 wherein the voltage across said capacitor is less than said certain voltage before said power is applied to said load.

UNITED STATES PATENT OFFICE
CERTIFICATE OF CORRECTION

Patent No. 3,602,773  Dated August 31, 1971

Inventor(s) Albert Bernstein

It is certified that error appears in the above-identified patent and that said Letters Patent are hereby corrected as shown below:

| | |
|---|---|
| Column 4, line 35 | "responsively" should be -- responsive -- |
| Column 4, line 38 | After "when" insert -- said current exceeds a given value; and -- |

Signed and sealed this 25th day of April 1972.

(SEAL)
Attest:

EDWARD M. FLETCHER, JR.
Attesting Officer

ROBERT GOTTSCHALK
Commissioner of Patents